United States Patent [19]

Wheatley, Jr. et al.

[11] 3,904,927

[45] Sept. 9, 1975

[54] VOLTAGE REDUCTION CIRCUIT FOR DEFLECTION YOKE

[75] Inventors: Carl Franklin Wheatley, Jr., Somerset; Oleksij Shevchenko, Somerville, both of N.J.

[73] Assignee: RCA Corporation, New York, N.Y.

[22] Filed: June 8, 1973

[21] Appl. No.: 368,161

[52] U.S. Cl. .......... 315/408
[51] Int. Cl.² .......... H01J 29/70
[58] Field of Search ... 178/7.5 R; 315/27 R, 27 TD, 315/25, 26, 24, 408

[56] References Cited

UNITED STATES PATENTS

| | | | |
|---|---|---|---|
| 3,402,320 | 9/1968 | Christopher | 315/27 TD |
| 3,732,458 | 5/1973 | Wolber | 315/27 GD |
| 3,764,846 | 10/1973 | Gantt | 315/27 TD |
| 3,787,750 | 1/1974 | Murphy et al. | 315/27 TD |

*Primary Examiner*—T. H. Tubbesing
*Assistant Examiner*—J. M. Potenza
*Attorney, Agent, or Firm*—Eugene M. Whitacre; Paul J. Rasmussen

[57] ABSTRACT

In a horizontal deflection circuit including a switch for coupling an energy source to a deflection yoke and for inducing alternating current in an output transformer, two horizontal deflection coils are serially coupled between the energy source and a point of reference potential and a winding of the output transformer is serially coupled between the two deflection coils and poled in the circuit such that the retrace pulse component developed in the winding opposes the retrace pulse developed across the coils for reducing the total pulse voltage across the coils.

6 Claims, 5 Drawing Figures

APR 14 1975

VOLTAGE REDUCTION CIRCUIT FOR DEFLECTION YOKE

BACKGROUND OF THE INVENTION

This invention relates to a circuit arrangement for reducing the peak voltage developed across serially coupled deflection windings.

The deflection circuits and an associated electromagnetic deflection yoke in a television receiver serve the function of magnetically deflecting the electron beam, or beams in the case of a color television receiver, of a picture tube over a phosphor screen of the tube for forming a raster scan which serves to reproduce the televised picture. In the United States a pair of vertical deflection coils are energized to produce almost 60 vertical fields each second, and, simultaneously, a pair of horizontal deflection coils are energized to produce 15,750 (or 15,734 for color) horizontal scanning lines each second. Each horizontal scanning interval takes 63.5 microseconds of which the actual scanning time from left to right across the viewing screen of the picture tube takes approximately 53 microseconds. The retrace time, during which the video signal modulation is removed from the beam and the beam is deflected from right to left in preparation for the next scanning interval, takes approximately 10.5 microseconds.

As it takes approximately the same change of energy to move the beam or beams right to left during the retrace interval as it does to move them left to right during the trace interval, a relatively high retrace or flyback voltage pulse is developed across the horizontal deflection coils during the retrace interval as the deflection current through the coils rapidly changes. This retrace pulse is most useful in that it can be stepped up by an output transformer associated with the deflection circuit and rectified for producing direct current operating voltages for other parts of the receiver such as the picture tube. However, the relatively high voltage retrace pulse can rise to an even higher voltage level during an out of sync operating condition or when there is a raster overscan condition. Under such circumstances the electrical insulation between conductors of the coils, such as the conductors of the horizontal and vertical coils, may be stressed to the point at which arcing occurs. Continued arcing could permanently damage the coils or other deflection circuit components.

It may be desirable to utilize a toroidally wound deflection yoke instead of a saddle-type yoke as the toroid utilizes less copper wire and may have its conductors accurately placed for producing a particular desired magnetic deflection field. Because the toroidal coils utilize less copper wire, the exhibit less impedance than the saddle-type coils and more scanning current is required for producing a particular strength deflection field. While devices such as silicon controlled recitifers are available to supply ample scanning current to a pair of horizontal deflection coils electrically connected in parallel, it may be desirable to utilize a single transistor as a horizontal output power device for economic reasons. Because of the peak current limitations of presently available transistors suitable for this purpose, it is often necessary to connect the two toroidally wound horizontal deflection coils in series to raise the impedance of the coils presented to the output transistor. In addition, it is frequently desirable to place a linearity correction network and a pincushon distortion correction circuit element such as a transformer winding in series with the horizontal coils to effect desired raster correction. Such additional components in series with the horizontal coils raises the total impedance presented to the output transistor and, as a consequence, a higher voltage retrace pulse a developed across the series deflection components. It follows that it would be highly desirable to limit the peak voltage developed across the deflection coils to prevent electrical breakdown and still provide adequate energy for the circuit.

SUMMARY OF THE INVENTION

In accordance with one embodiment of the invention, a deflection circuit for reducing the peak voltage developed across a deflection winding is provided. A switching means operable from a first to a second state during each deflection cycle is coupled to a transformer. First and second deflection coils are serially coupled to the junction of the switching means and the transformer. A winding of the transformer is coupled between the two deflection coils and poled such that as the switching means operates from the first to the second state the voltage developed across the winding is of the opposite polarity to the voltage developed across the deflection coils, thereby reducing the peak voltage across the deflection coils.

A more detailed description of the invention is given in the follwong description and accompanying drawing of which:

FIG. 1 is a partly block and partly schematic diagram of a deflection circuit embodying the invention; and FIGS. 2*a*–2*d* illustrate waveforms obtained at various points in the circuit of FIG. 1.

DETAILED DESCRIPTION OF THE INVENTION

Figures 1, 2A, 2B, 2C, 2D:
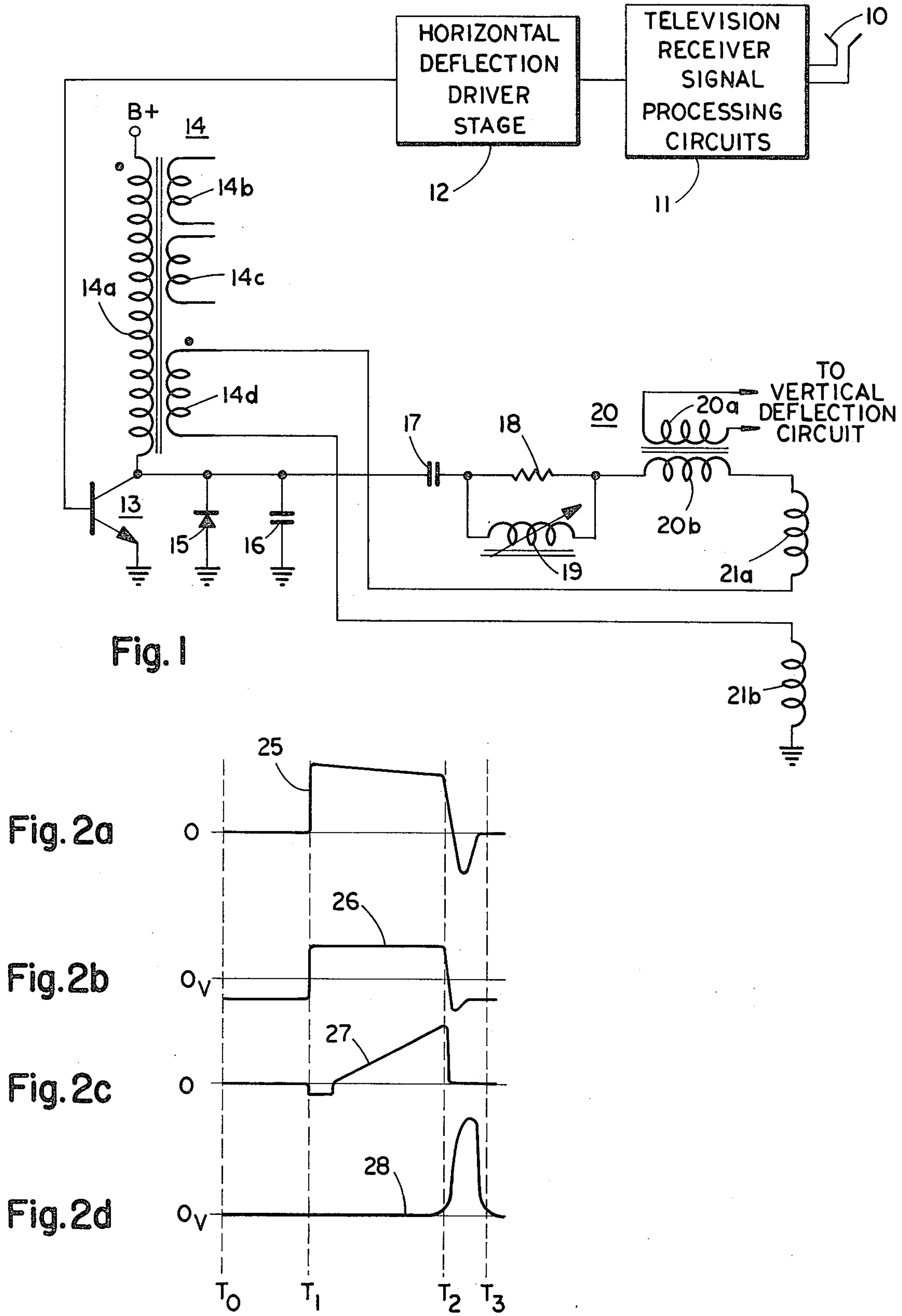

FIG. 1 is a partly block and partly schematic diagram of a deflection circuit embodying the invention. A television antenna 10 is coupled to television receiver signal processing circuits 11. This portion of the receiver separates the audio, video and synchronizing signal components of the received composite television signal and processes them in a conventional manner. The horizontal sync pulses are then utilized to synchronize a horizontal oscillatior of the television receiver. Suitable signals from the horizontal oscillator stage are coupled to a horizontal deflection driver stage 12. This stage provides suitable drive signals for the horizontal output circuit.

Waveforms 25 and 26 of FIGS. 2*a* and 2*b*, respectively, illustrate normalized current and voltage waveforms which are coupled from the driver stage to the base electrode of a horizontal output transistor 13. The emitter of transistor 13 is grounded and the collector is coupled through a winding 14*a* of a horizontal output transformer 14 to a source of operating potential B+. Windings 14*b*, 14*c* of output transformer 14 may be utilized in a conventional manner for supplying high voltage retrace pulses to a high voltage rectifier for providing picture tube anode voltage, and for providing horizontal rate pulses for blanking purposes. The collector electrode of transistor 13 is also coupled to the cathode of a damper diode 15, the anode of which is grounded, and to a terminal of a retrace capacitor 16, the other terminal of which is grounded. The collector electrode is also coupled through an S-shaping capacitor 17, a linearity correction network comprising the parallel combination of a resistor 18 and an adjustable inductance 19, a winding 20*b* of a pincushion correction transformer 20, a first horizontal deflection coil 21*a*, a winding 14d of horizontal output transformer 14, and a second horizontal deflection coil 21b to ground. A winding 20a of pincushion distortion correction transformer 20 is coupled to a source of vertical rate deflection signals, not shown, so that the horizontal scanning current may be modulated at a vertical deflection rate for achieving side pincushion correction in a conventional manner.

Generally, with the exception of the addition of winding 14d in the circuit, the operation of the deflection circuit is conventional and will be described only briefly. Waveform 27 of FIG. 2*c* illustrates the collector current of horizontal output transistor 13 and waveform 28 of FIG. 2*d* illustrates the voltage developed across transistor 13.

The trace portion of each deflection cycle begins at time $T_0$. At this time current is flowing from ground through diode 15, capacitor 17, the linearity network, the pincushion correction winding 20*b*, deflection coil 21*a*, transformer winding 14*d* and deflection coil 21*b* to ground. This current is at a maximum negative value at time $T_0$ and linearly increases toward zero which occurs shortly after time $T_1$. At $T_1$ the drive waveforms 25 and 26, coupled to the base of transistor 13 forward biases transistor 13 in preparation for the deflection coil current reversal. The deflection current then increases to a positive value in a linearly increasing manner, the scanning current path now being from ground through the deflection coils, the transformer winding 14*d*, the pincushion winding 20*b*, the linearity correction network, S-shaping capacitor 17 and the collector-emitter path of transistor 13 to ground. At time $T_2$ the drive waveform to the base electrode of transistor 13 reverse biases that transistor and transistor 13 cuts off. The deflection yoke current now starts to decrease in the resonant circuit formed essentially by the deflection coils and retrace capacitor 16. This resonant condition lasts for a half cycle during which the relatively high voltage retrace pulse portion shown by waveform 28 of FIG. 2d, and occurring during the retrace interval $T_2$14 $T_3$, is formed. This large positive voltage value decreases as capacitor 16 discharges through the deflection coils and, damper diode 15 again starts to conduct, initiating the next trace interval.

It is the retrace pulse portion of waveform 28 of FIG. 2*d* which may cause the insulation of the horizontal and vertical deflection windings to break down if instantaneous yoke voltages exceed the design limitations of the deflection yoke. This retrace pulse may be in the order of 600–700 volts. In FIG. 1, as the retrace pulse rises in a positive manner at the collector electrode of transistor 13, it can be seen that this positive voltage also appears across deflection coils 21*a* and 21*b* and ground. However, at the same time that this positive pulse component is present, there is developed across the winding 14d a retrace pulse component which is negative with respect to the retrace pulse developed at the collector of transistor 13 as determined by the poling of the winding terminals as shown. As the voltages of winding 21*a* with respect to ground are elevated by the sum of the voltage across winding 21*b* and the voltages across winding 14*d*, and, as the voltage across winding 14*d* is of opposite polarity as that of winding 21*b*, it follows that all voltages of winding 21*a*, relative to ground, are decreases by the amount of voltage developed across winding 14*d* as opposed to a conventional series yoke connection arrangement in which the two deflection coils would be directly coupled. For example, if the peak positive retrace voltage developed at the collector of transistor 13 is +700 volts and the breakdown voltage for the deflection winding is about 625 volts, the number of turns of transformer winding 14*d* may be selected to produce a negative or bucking voltage in the order of 100–150 volts to lower the peak pulse voltage across the two series connected coils to a value below the maximum voltage ratings.

What is claimed is:

1. A deflection circuit for reducing the peak voltage developed across a deflection winding, comprising:

switching means operable from a first to a second state during each deflection cycle in response to control signals applied thereto;

a transformer coupled to said switching means and to a source of operating potential;

first and second deflection coils serially coupled to said switching means and said transformer and to a point of reference potential; and a winding of said transformer serially coupled between said first and second serially coupled deflection coils, sais winding poled such that the volatage developed thereacross as said switching means operates from said first to said second state is of the opposite polarity relative to the voltage developed across said deflection coils at the same time for reducing the peak voltage appearing across said deflection coils.

2. A deflection circuit according to claim 1 wherein a capacitor is serially coupled with said switching means and said deflection coils.

3. A deflection circuit according to claim 2 wherein raster correction impedance means are serially coupled with said deflection coils.

4. A deflection circuit according to claim 3 wherein said switching means comprises a transistor having its main conduction path coupled between said transformer and a point of reference potential.

5. A deflection circuit for reducing the peak voltage developed across a deflection winding, comprising:

switching means operable from a first to a second state during each deflection cycle in response to control signals applied thereto;

a transformer having a first winding coupled between said switching means and a source of operating potential;

a capacitor and first and second deflection coils serially coupled to said switching means and said first winding and a point of reference potential; and a second winding of said transformer serially coupled between said first and second deflection coils and poled such that the voltage developed thereacross as said switching means operates from said first to said second state is of the opposite polarity relative to the voltage developed across said deflection coils, thereby reducing the peak voltage appearing across said deflection coils.

6. A deflection circuit according to claim 5 wherein said switching means comprises a transistor having one electrode of its main current conduction path coupled to a terminal of said first winding remote from said source of operating potential and a second electrode of its main current conducting path coupled to a source of reference potential.

* * * * *